United States Patent
Venaas et al.

(10) Patent No.: US 9,325,605 B2
(45) Date of Patent: Apr. 26, 2016

(54) ON-DEMAND BOOT STRAP ROUTER SOURCE ANNOUNCEMENTS

(71) Applicant: Cisco Technology, Inc., San Jose, CA (US)

(72) Inventors: Stig Ingvar Venaas, Oakland, CA (US); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 13/835,644

(22) Filed: Mar. 15, 2013

(65) Prior Publication Data

US 2014/0269412 A1   Sep. 18, 2014

(51) Int. Cl.
*H04L 12/761*   (2013.01)
*H04L 12/18*   (2006.01)

(52) U.S. Cl.
CPC .............. *H04L 45/16* (2013.01); *H04L 12/18* (2013.01)

(58) Field of Classification Search
None
See application file for complete search history.

(56) References Cited

U.S. PATENT DOCUMENTS

| | | | |
|---|---|---|---|
| 7,418,003 B1 | 8/2008 | Alvarez et al. | |
| 7,808,993 B2 | 10/2010 | Zwiebel et al. | |
| 7,936,702 B2 | 5/2011 | Kessler et al. | |
| 8,144,628 B2 | 3/2012 | Previdi et al. | |
| 2003/0018715 A1* | 1/2003 | O'Neill | 709/204 |
| 2003/0223372 A1* | 12/2003 | Sanchez et al. | 370/237 |
| 2004/0100983 A1* | 5/2004 | Suzuki | 370/432 |
| 2005/0038909 A1* | 2/2005 | Yoshiba et al. | 709/241 |
| 2006/0159091 A1* | 7/2006 | Boers et al. | 370/390 |
| 2007/0153790 A1* | 7/2007 | Boers et al. | 370/390 |
| 2007/0165632 A1 | 7/2007 | Zwiebel | |
| 2008/0313450 A1 | 12/2008 | Rosenberg | |
| 2009/0041019 A1* | 2/2009 | He et al. | 370/392 |
| 2010/0195529 A1* | 8/2010 | Liu et al. | 370/252 |
| 2011/0188499 A1* | 8/2011 | Wijnands et al. | 370/390 |
| 2011/0211578 A1 | 9/2011 | Zwiebel et al. | |
| 2012/0188909 A1 | 7/2012 | Previdi et al. | |
| 2013/0013806 A1 | 1/2013 | Woo et al. | |
| 2013/0100953 A1* | 4/2013 | Li et al. | 370/390 |
| 2014/0086133 A1* | 3/2014 | Zhang et al. | 370/312 |
| 2014/0269412 A1* | 9/2014 | Venaas et al. | 370/254 |

OTHER PUBLICATIONS

Bhaskar, et al., "Bootstrap Router (BSR) Mechanism for Protocol Independent Multicast (PIM)", Network Working Group, Request for Comments 5059, Jan. 2008, 42 pages, The Internet Engineering Task Force Trust.

(Continued)

*Primary Examiner* — Benjamin H Elliott, IV
(74) *Attorney, Agent, or Firm* — Parker Ibrahim & Berg LLC; James M. Behmke; Stephen D. LeBarron

(57) ABSTRACT

In one embodiment, a node in a communication network receives a request for messages of a particular group, determines a rendezvous point, and transmits the request to the rendezvous point to cause the rendezvous point to return a source-message indicating a source-node of the particular group. The node further creates a path from itself to the source-node and receives messages of the particular group according to the path.

19 Claims, 13 Drawing Sheets

(56) References Cited

OTHER PUBLICATIONS

Bhattacharyya, et al., "An Overview of Source-Specific Multicast (SSM)", Network Working Group, Request for Comments 3569, Jul. 2003, 14 pages, The Internet Society.

Fenner, et al., "Protocol Independent Multicast—Sparse Mode (PIM-SM): Protocol Specification (Revised)", Network Working Group, Request for Comments 4610, Aug. 2006, 150 pages, The Internet Society.

* cited by examiner

ON-DEMAND BOOT STRAP ROUTER SOURCE ANNOUNCEMENTS

TECHNICAL FIELD

The present disclosure relates generally to communication networks, and, more particularly, to on-demand boot strap router (BSR) source announcements.

BACKGROUND

In packet-switched networks, a node can include a router that determines a next network point (e.g., a subsequent node) to which a data packet is forwarded toward its destination. The node is typically coupled to at least two subsequent network points and decides which way to send each data packet based on its current understanding of the state of the network to which it is connected. A node can create or maintain a routing table of the available routes and corresponding conditions and use this information along with distance and cost algorithms to determine a best route for a given data packet. Typically, a data packet may travel through a number of nodes before arriving at its respective destination.

Unicast, broadcast, and multicast are three conventional techniques for transmitting data packets (e.g., audio and video data packets) from a source node (e.g., a server) to one or more receiver nodes (e.g., a desktop computer system) via packet-switched networks. Unicast is a point-to-point communication technique wherein data packets are transmitted between a single source and a single receiver. Broadcast communication enables one source node to transmit data packets to each receivers within a broadcast domain. Multicast allows a source node or several source nodes to transmit data packets simultaneously to select receiver nodes according to a group subscription, i.e., receiver nodes subscribed to a multicast group. During multicast transmission, multicast data packets are replicated by multicast enabled nodes (e.g., routers) at the point where communication paths diverge to separate receivers of a multicast group.

Typically, in multicast communication networks, nodes or routers store information for each active source. Accordingly, if the node receives local interest for a particular group (e.g., a request), the node joins a path for the active sources for the group. However, some nodes can have limited memory (e.g., an edge router) and thus, may either use valuable storage space to store information for each active source and/or may not be capable of storing all of the information for each active source.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node in a communication network receives a request for messages of a particular group, determines a rendezvous point, and transmits the request to the rendezvous point to cause the rendezvous point to return a source-message indicating a source-node of the particular group. The node further creates a path from itself to the source-node and receives messages of the particular group according to the path.

In other additional embodiments of this disclosure, a rendezvous point in a communication network can receive an announcement message indicating one or more source-nodes and associated groups and also receive a request from a node for messages of a particular group. The rendezvous point can determine a corresponding source-node of the particular group and transmit, in response to the request, a source-message indicating the corresponding source-node for the particular group to cause the node to create a path from the node to the source-node to receive messages of the group according to the created path.

Description

A communication network comprises geographically distributed nodes (e.g., devices of a distributed data center or end-client devices such as personal computers and workstations, or other devices) interconnected by communication links for transporting data between end nodes. Various types of network are available and can include, for example, local area networks (LANs), wide area networks (WANs), etc. In addition, each of these various types of networks can support various communication technologies such as multicast, and non-multicast (e.g., unicast) communication. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, and others.

FIGS. 1A-1D collectively illustrate various nodes/devices in a communication network and corresponding network paths to join receivers to sources based on a specified group.

Figure 1A:
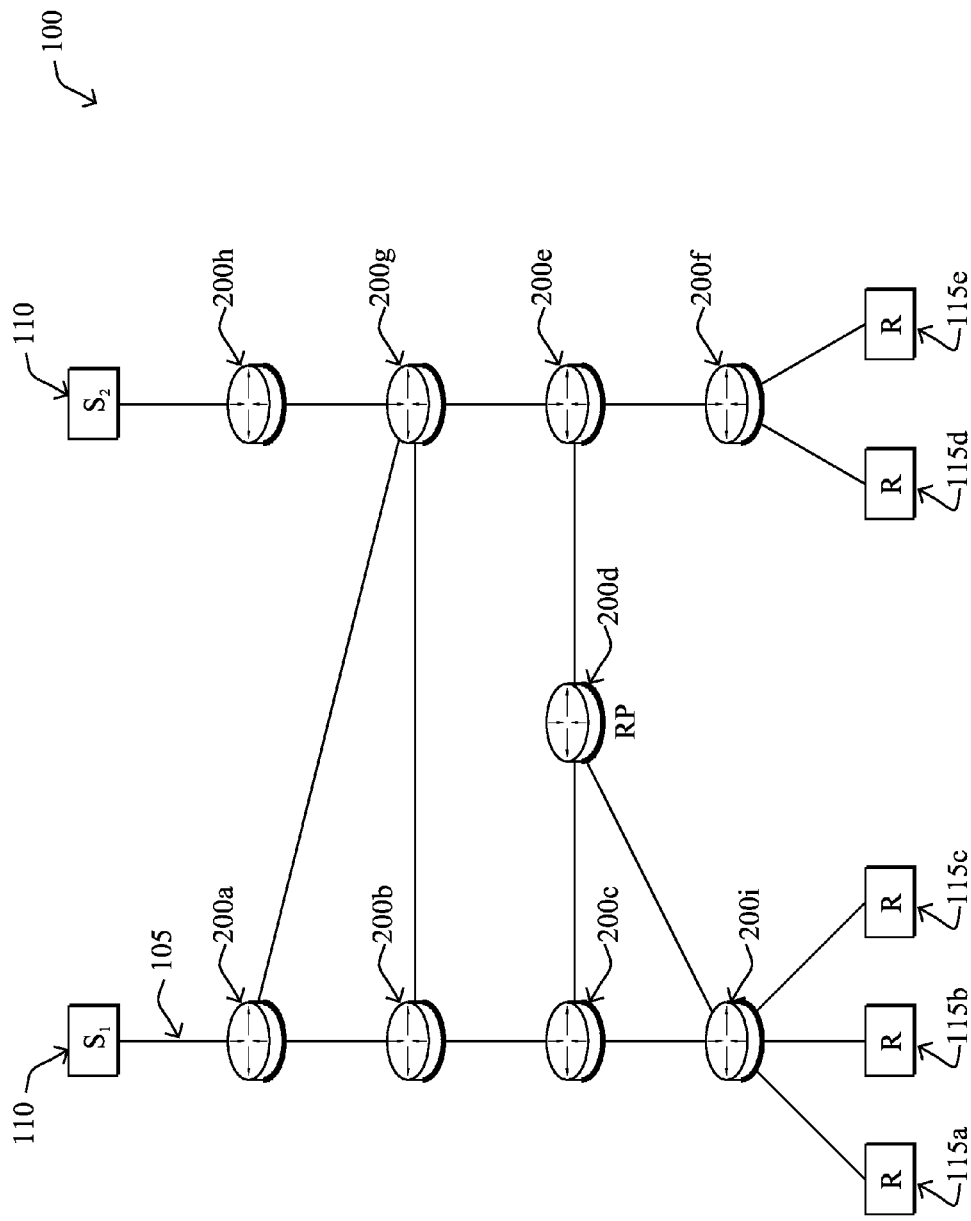
FIGS. 1A-1D collectively illustrate various nodes/devices in a communication network and corresponding network paths to join receivers to sources based on a specified group.

Referring particularly to FIG. 1A, an example communication network 100 illustratively comprises nodes/devices 200, sources "S" and receivers "R" interconnected by various methods of communication. For instance, the links 105 may be wired links or shared media (e.g., wireless links, power-line communication (PLC) links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the communication network, and that the view shown herein is for simplicity. Also, those skilled in the art will further understand that while the network is shown in a certain orientation, the network 100 is merely an example illustration that is not meant to limit the disclosure.

Communication network 100 can, for example, employ a packet-switched multicast routing protocol (e.g., Sparse Mode (SM), Source Specific Mode (SSM), etc.). Sources 110

(i.e., $S_1$ and $S_2$) are coupled to receivers 115a-e (or potential receivers) via a series of devices or routers 200 and data communication links 105. With respect to SM networks, the various multicast enabled nodes 200 can establish a default multicast distribution tree, referred to as a "shared tree", for each multicast group. Conventionally, the shared tree is rooted at a rendezvous point (RP) (e.g., node 200d), which acts as the distribution point for multicast data transmitted to receivers of a multicast group. Specifically, before a source can begin transmitting data to receivers of a multicast group, RP 200d discovers or learns about that source.

Figure 1B:
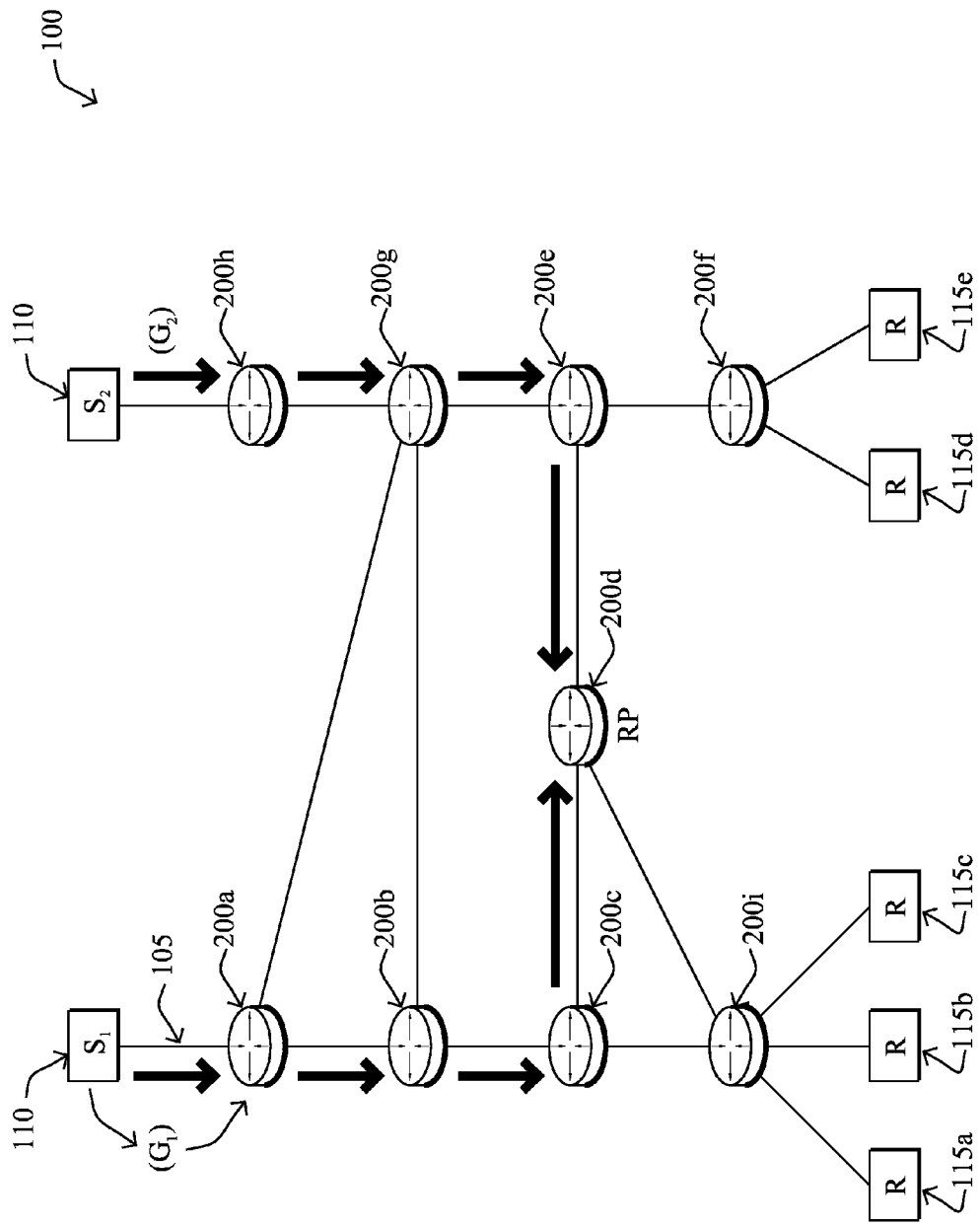

For example, FIG. 1B illustrates a Rendezvous Point (RP) learning of sources once registered. Particularly, RP 200d learns of the sources $S_1$ and $S_2$ when the sources first register with RP 200d.

Figure 1C:
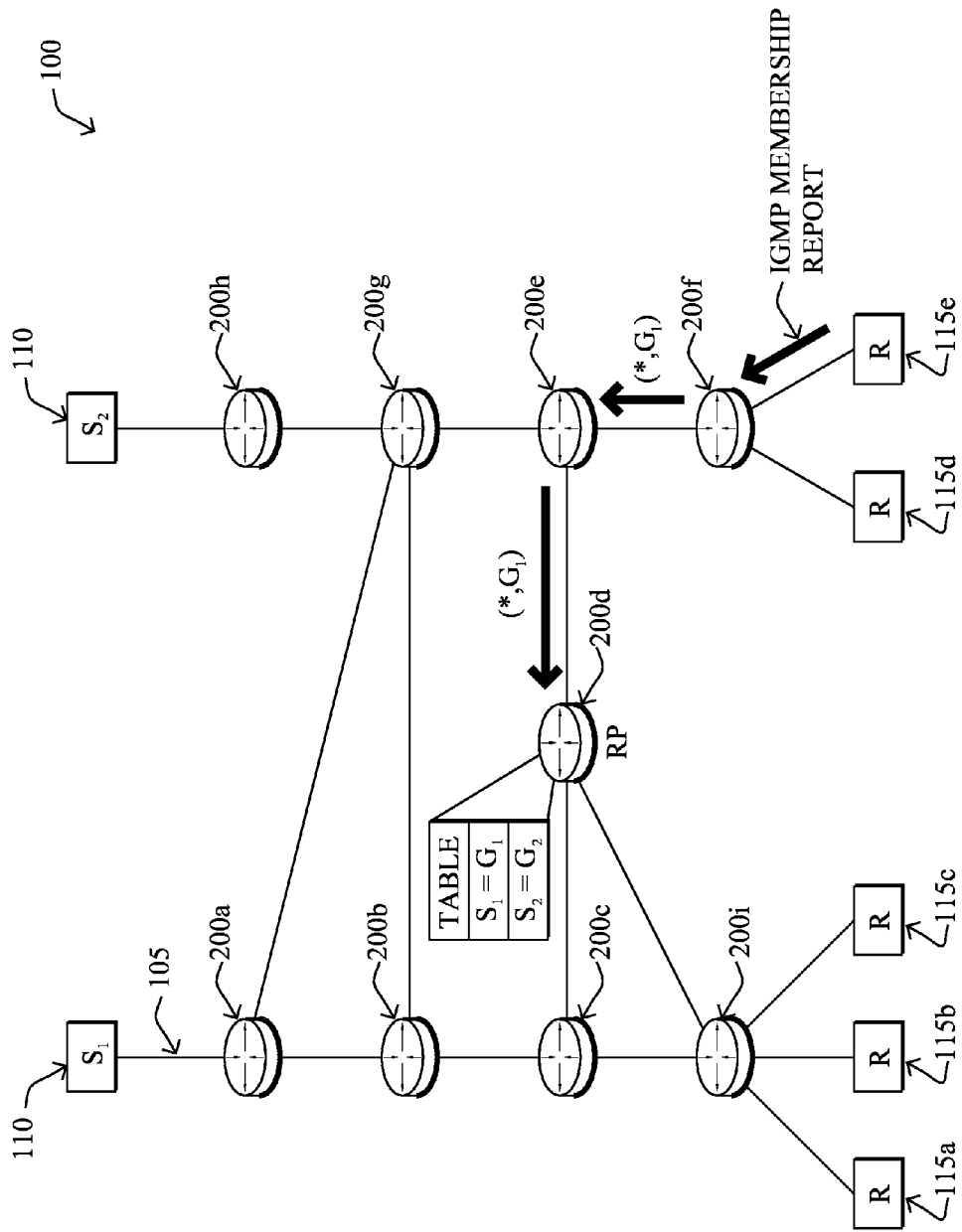

Additionally, for a receiver to join a multicast group, the receiver must join towards the RP router. Referring to FIG. 1C, a receiver (i.e., receiver 115e) can request to join a multicast group $G_1$ from RP 200d. Specifically, receiver 115e can join the multicast group $G_1$ by generating a membership report in compliance with Internet Management Group Protocol version 1 (IGMPv1) or Internet Management Group Protocol version 2 (IGMPv2). Typically, the address $G_1$ of the multicast group is included in the membership report along with the address (e.g., an Internet address) of receiver 115e. Once generated, receiver 115e transmits the IGMP report message to its router—namely router 200f (e.g., an edge router connected directly to a receiver)—indicating that it wants to join a multicast group.

Router 200f, in response to receiving the request (i.e., the IGMP report) from receiver 115e, generates a request to join multicast group $G_1$. In SM networks for example, the request is designated PIM(*, $G_1$) JOIN, and is sent hop-by-hop towards the RP (i.e., router 200d). The "*" of the request indicates that the device (e.g., router 115e) wants to join multicast group $G_1$ and receive data from all sources providing data to the multicast group $G_1$.

The request (i.e., PIM (*,$G_1$)JOIN) is transmitted from router 200f to the RP 200d via router 200e. RP router 200d, in response to receiving PIM (*,$G_1$)JOIN, accesses a local registry table to learn addresses of sources transmitting multicast group $G_1$ data—namely Source $S_1$. Once the source address is known, RP 200d creates a communication path between the source (i.e., $S_1$) and the requesting (i.e., router 115e).

Figure 1D:
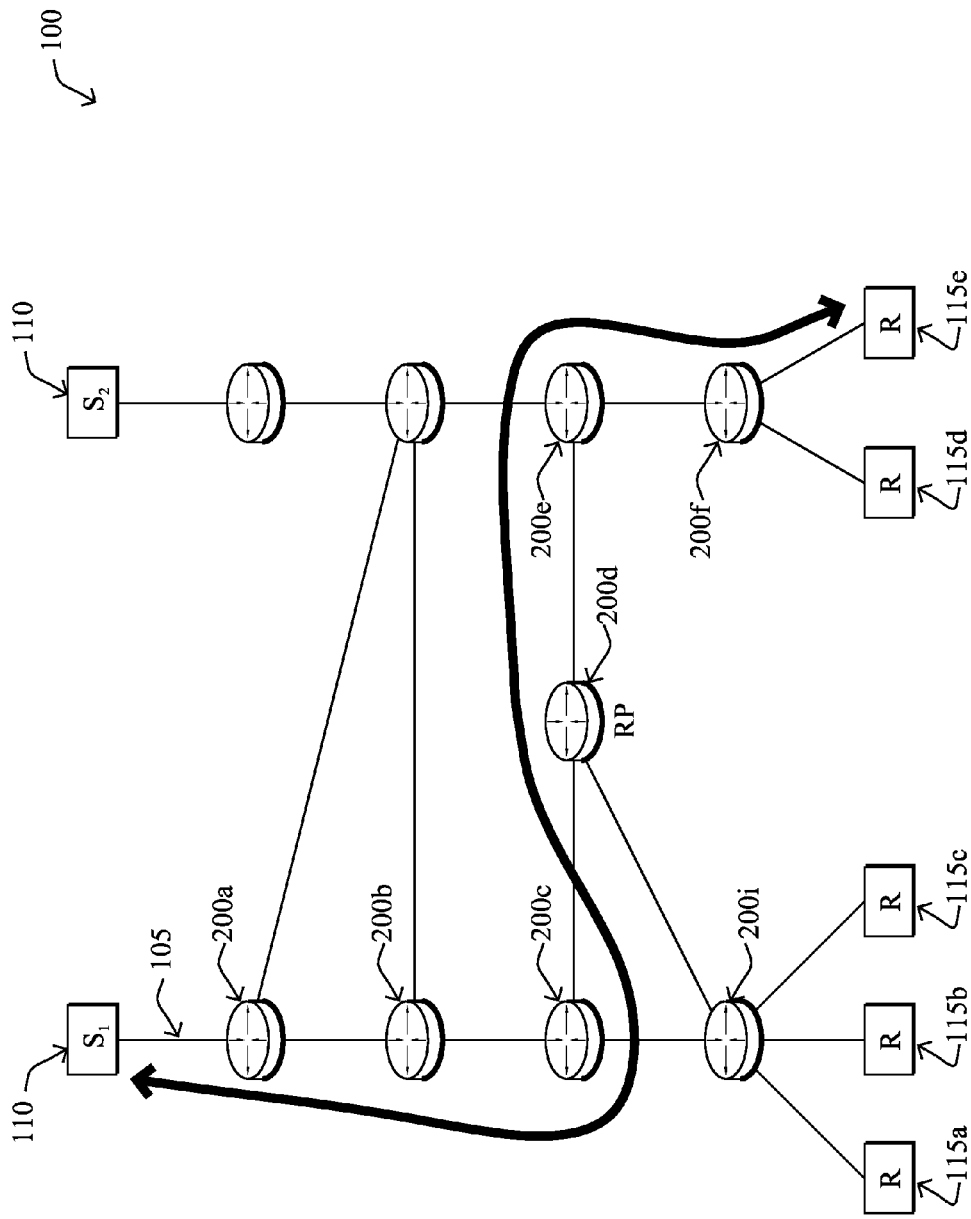

Accordingly, referring to FIG. 1D, RP 200d creates a communication path is between source $S_1$ and receiver 115e. Notably, the path includes RP router 200d. Receiver 115e receives data packets from source $S_1$ once the communication path is established.

Figure 2:
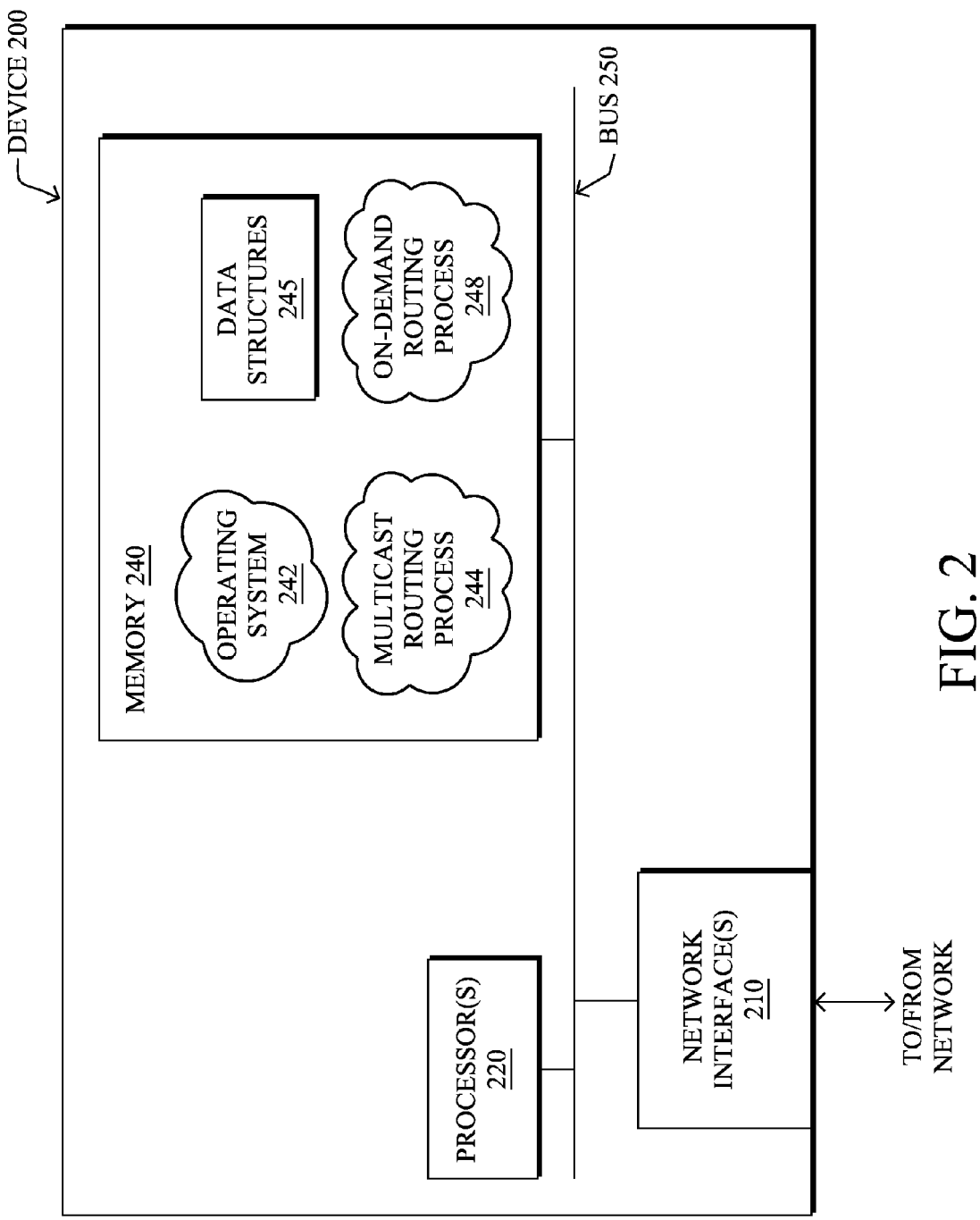
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over network 100. Network interfaces 210 may be configured to transmit and/or receive data using a variety of different communication protocols. Note that each device may include two different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise multicast routing process/services 244, and an on-demand routing process 248, as described herein. Note that while processes 244 and 248 are shown in centralized memory 240, additional embodiments provide for either of the processes to be specifically operated within the network interfaces 210.

Note further that while both processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Multicast routing process (services) 244 contains computer executable instructions executed by the processor 220 to perform functions provided by one or more multicast routing protocols, such as Sparse Mode (SM), Source Specific Mode (SSM), Any Source Multicast (ASM), etc., as will be understood by those skilled in the art. These functions may, on capable devices, be configured to manage a routing/forwarding table (a data structure 245) containing, e.g., data used to make routing/forwarding decisions. For example, the SM protocol is specified in an Internet Engineering Task Force (IETF) Proposed Standard, Request for Comment (RFC) 4601, entitled "Protocol Independent Multicast-Sparse Mode (PIM-SM): Protocol Specification (Revised)" by Fenner et al. (August 2006), and the SSM protocol is specified in RFC 3569, entitled "An Overview of Source-Specific Multicast (SSM)" by Bhattacharyya. (July 2003).

As noted above, a conventional communication network using multicast protocols (e.g., Sparse Mode (SM)) can provide Rendezvous Points (RPs) and shared trees to forward multicast packets to subsequent routers (e.g., Last Hop Routers (LHR) that are directly connected to corresponding receivers). After the first packet is received by the LHR, the source of the multicast stream is learned and the path to the source is joined. However, these multicast protocols require advance setup to establish appropriate Rendezvous Points (RPs), as well as sufficient memory to store various Protocol Independent Multicast (PIM) registers, RP locations, shared trees, etc. As discussed above, some nodes (e.g., edge routers) may have limited memory, which in turn, can affect overall network scalability.

Accordingly, the techniques herein provide for source messages (e.g., source announcements) to distribute source information to various nodes in a communication network. In this fashion, certain nodes (e.g., "core" routers) can store information such as addresses for sources and respective groups. In turn, certain other nodes (e.g., edge routers) need not store information locally, but instead can dynamically learn sources on-demand from the core nodes. For example, in one or more specific embodiments, the techniques illustratively provide for routers (e.g., edge routers) to learn sources when needed (e.g., on-demand) via, for example, Boot Strap Router (BSR) announcements sent from core nodes. That is, the techniques provide for flooding source information from First Hop Routers (connected directly to respective sources) to core routers within the communication network and sending source information via announcements from the core routers to requesting nodes dynamically or on-demand.

Illustratively, the techniques described herein may be performed by hardware, software, and/or firmware, such as in accordance with the "on-demand" process 248, which may contain computer executable instructions executed by the processor 220 (or independent processor of interfaces 210) to perform functions relating to the techniques described herein, e.g., in conjunction with multicast routing process 244. For example, the techniques herein may be treated as an enhancement of conventional protocols, such as BSR protocols (e.g., source discovery techniques, etc.) or other communication protocols, and as such, may be processed by similar components understood in the art that execute those protocols, accordingly.

Operationally, under the control of on-demand routing process 248, a device/node can receive a request for messages of a particular group, determine, relative to the node, a rendezvous point, and transmit the request from the node to the rendezvous point to cause the rendezvous point to return a source-message indicating a source-node of the particular group. The node further creates a path (from the node) to the source-node, and receives messages of the particular group at the node according to the path.

In additional embodiments, the techniques provide for a device/node that can act as a rendezvous point (RP) (e.g., a router), which can receive an announcement message indicating one or more source-nodes and associated groups. The RP can further receive a request from a node for messages of a particular group, determine a corresponding source-node of the particular group, and transmit, in response to the request, a source-message indicating the corresponding source-node for the particular group, which causes the node to create a path from the node to the source-node to receive messages of the group according to the created path.

For example, FIGS. 3A-3F collectively illustrate example views of the on-demand process 248 executed in a communication network 100 with respect to various nodes (e.g., First Hope Routers (FHR), Last Hop Routers (LHR), Rendezvous Points (RPs), etc.) For purposes of discussion herein below, assume that receiver 115e requests to join a group ($G_1$), which group can be sourced from Source 110 (or $S_1$). Although it is understood by those skilled in the art that each source can include multiple groups and each receiver may request multiple groups, the views shown herein are for facilitating understanding and are not to be construed as limiting this disclosure.

Figure 3A:
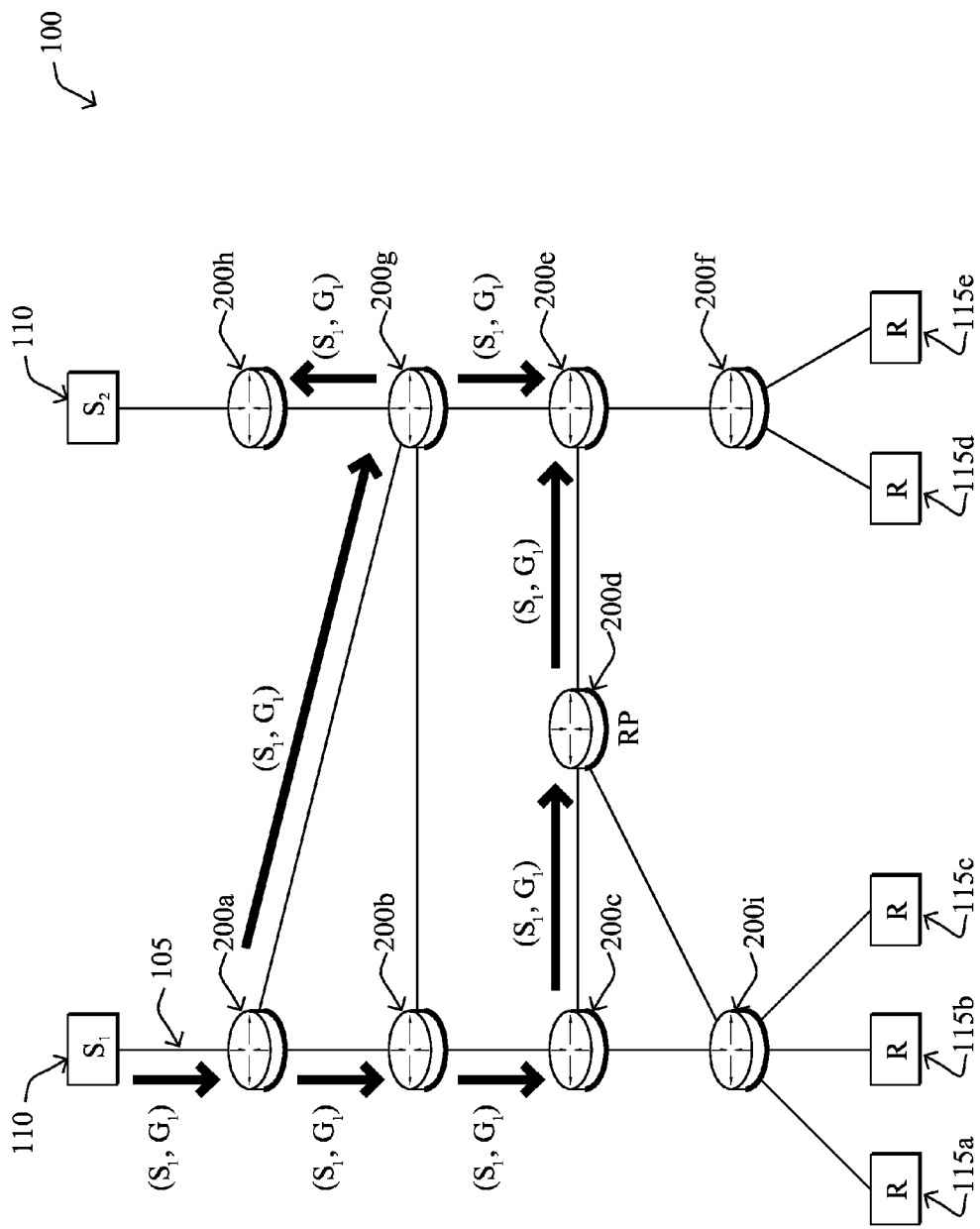
FIGS. 3A-3F collectively illustrate example views of the on-demand process executed in a communication network with respect to various nodes.

Referring particularly to FIG. 3A, first hop router 200a can flood source information throughout the domain, or at least to various "core" routers (e.g., routers that can locally save the source information for all active source). Note, as discussed above, edge nodes or edge routers such as router 200f can have limited memory and may not locally save source information from each source. Rather, as discussed herein, the edge router can learn sources for a particular group on-demand via, for example, BSR announcements).

Figure 3B:
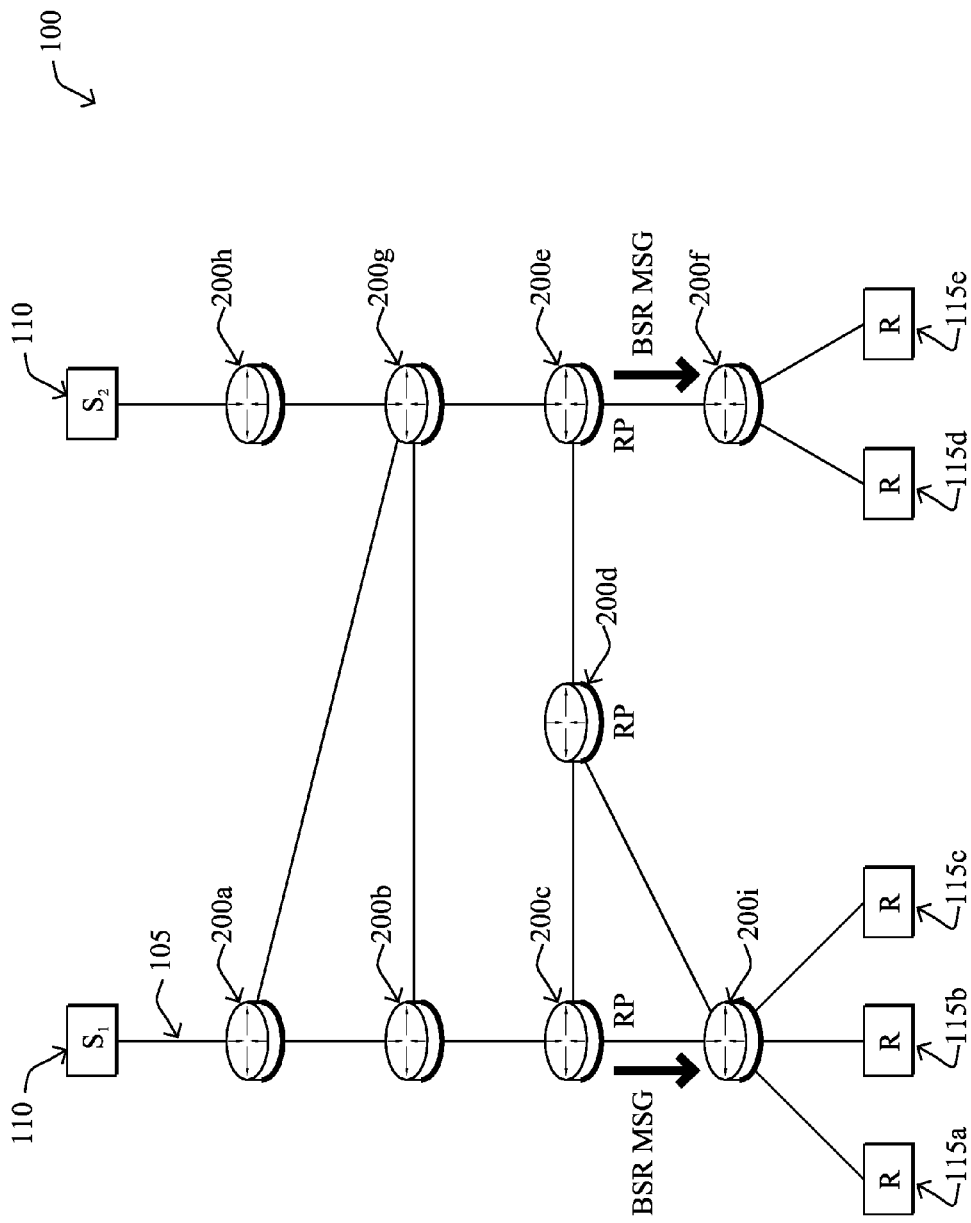

For example, with reference to FIG. 3B, each "core" router (e.g., node 200c and 200e) can announce itself (e.g., via BSR announcements) as a RP for subsequent nodes—here, nodes 200i and 200f, respectively. That is, each RP can be a BSR router that advertises rendezvous point mapping to respective subsequent nodes. In this fashion, the communication network does not need to setup specific Rendezvous Points, PIM registers and shared tress. Instead, the various core node RPs simplify the operation of multicasting (e.g., Any Source Multicasting (ASM)). Notably, although nodes 200i and 200f are shown as Last Hop Routers (LHRs) (e.g., directly connected to respective receivers), in other embodiments, these nodes can continue to propagate the announcements toward additional nodes or routers at the edge of the network. Moreover, in some embodiments RP nodes 200c and 200e can be a First Hop Router (FHR) (e.g., directly connected to a source).

Figure 3C:
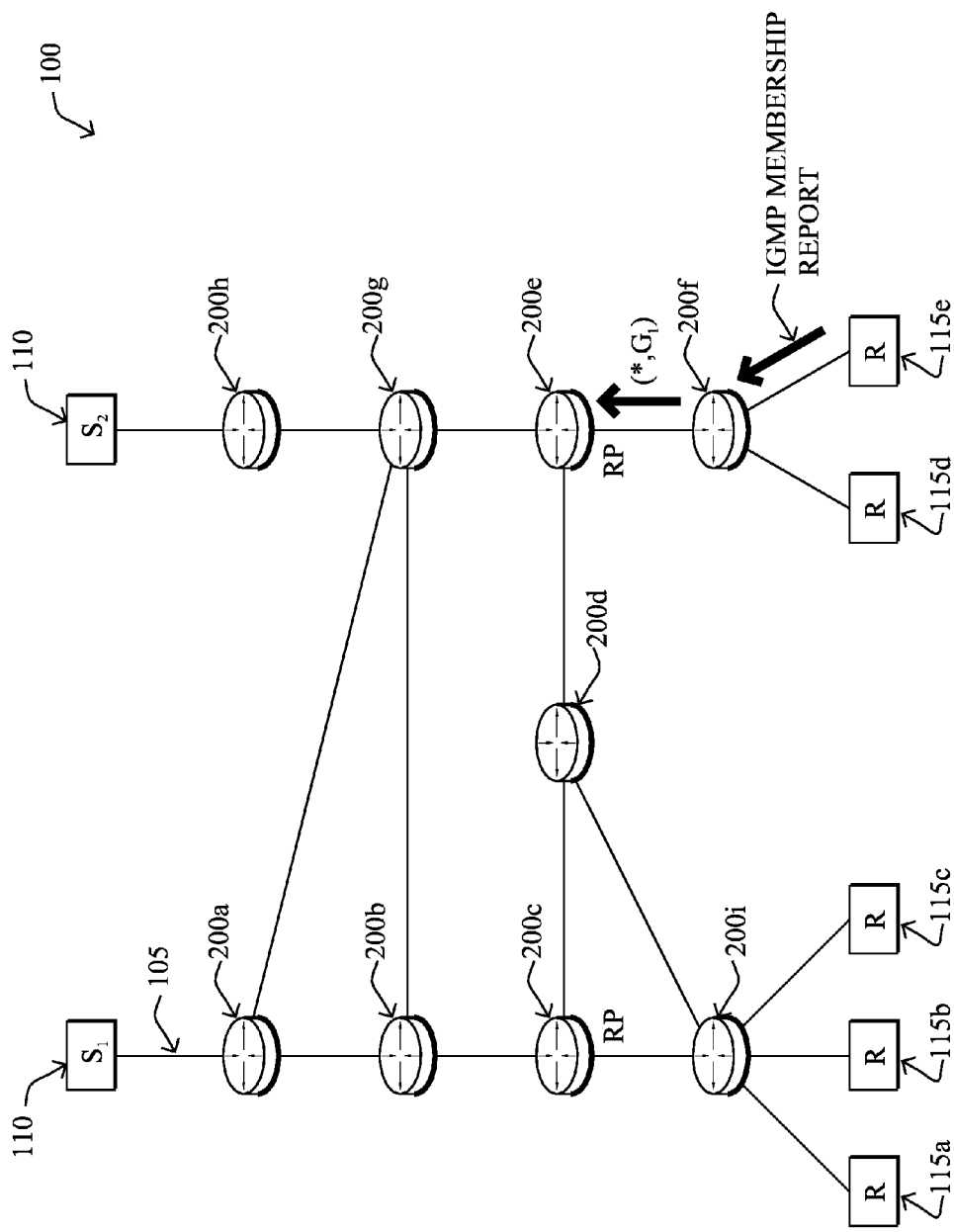

FIG. 3C illustrates node 200f receiving a join request from receiver 115e. As discussed above, receiver 115e can generate and transmit an IGMP membership report to node 200f. In response, node 200f can generate and transmit a join request for the specified multicast group (i.e., Group "$G_1$"). Node 200f transmits the request to RP 200e. As discussed above, in SM networks, the request can be designated PIM (*,$G_1$)JOIN, where the "*" indicates the receiver 115e should receive data from all sources providing data to the multicast group $G_1$. For purposes of explanation, it is presumed that Source $S_1$ is the only source providing data to multicast group $G_1$.

Figure 3D:
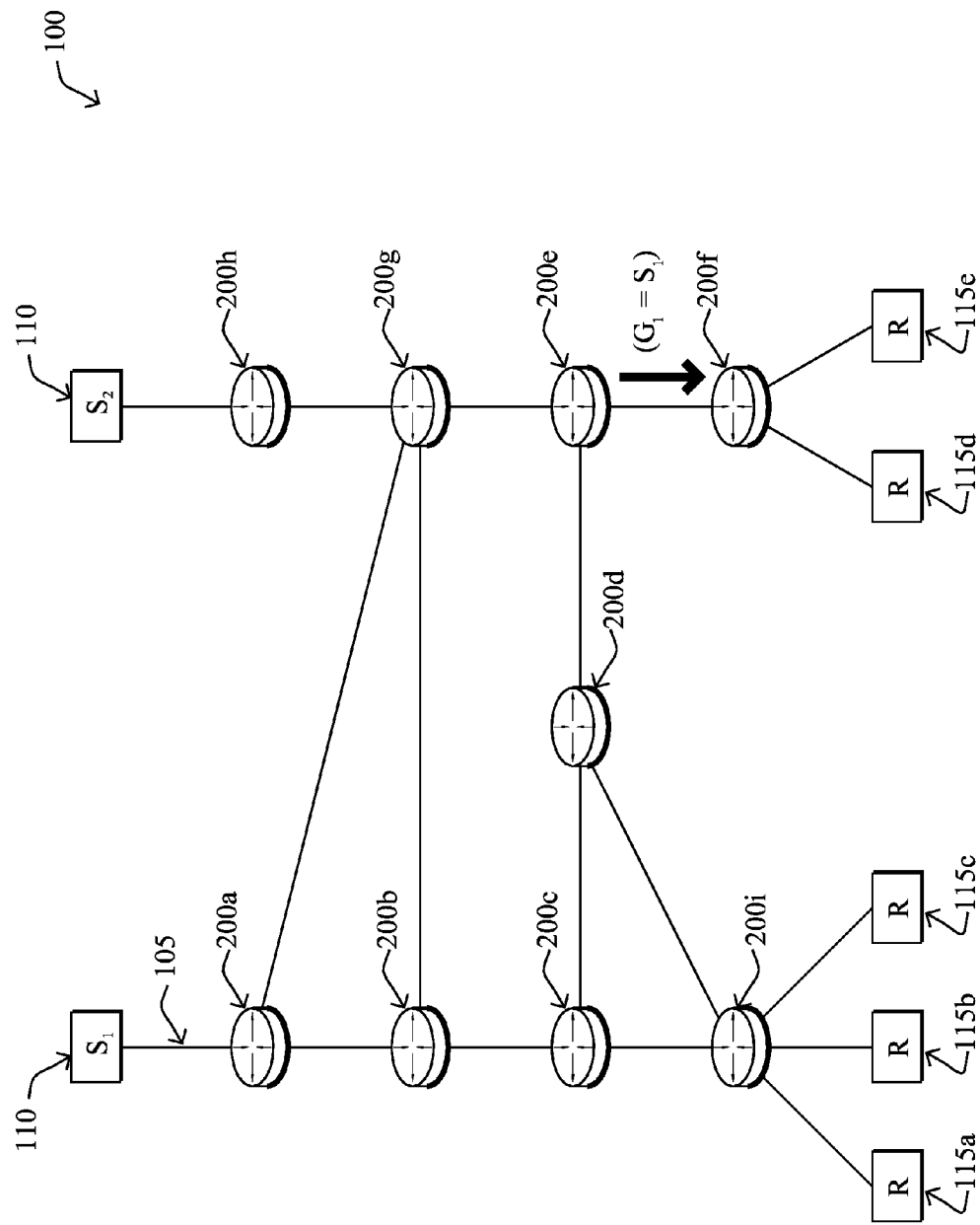

When RP 200e receives the join request (i.e., (*,$G_1$)JOIN), it can return a source-message indicating a source node of the particular group, as shown in FIG. 3D. That is, RP 200e, in response to the request from node 200f, can send a BSR source announcement to node 200f. Notably, the BSR source announcement is generally a control plane message that indicates the source $S_1$ (that is, the techniques herein use (*,G) state (the shared tree) as indication that the router wants to get the source announcements, but no data is forwarded using the shared tree).

In some embodiments, the RP may be several nodes "upstream" from the edge node connected to the receiver. In these embodiments, the BSR source announcement can be sent down the shared tree via, for example, hop-by-hop, similar to other BSR messages and using a "Do-Not-Forward" bit as is understood by those skilled in the art. However, instead of conventional Reverse Path Forwarding (RPF), the messages can be sent according to an outgoing interface list of the request (*,G).

In some additional embodiments, source announcement messages for each (*G) containing the active sources for the specific group "G" can be sent periodically. In these embodiments, the requesting node (e.g., edge router) can ignore sources for groups it has no interest in. Alternatively, join requests for all sources for all the groups (*,G) can be combined into one list and sent via a single message with all the sources per interface.

Figure 3E:
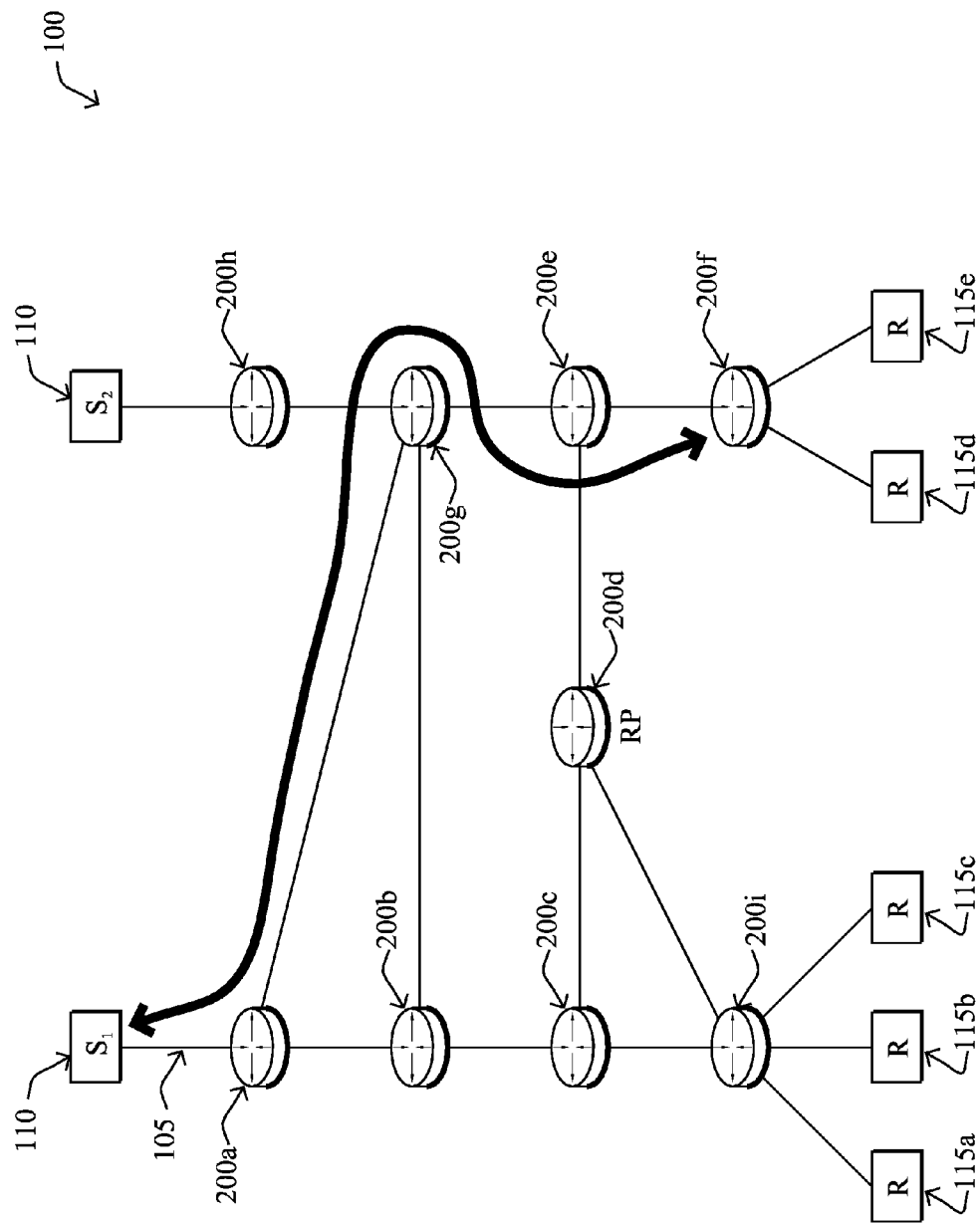

FIG. 3E shows node 200f creating a path from itself to the source-node (e.g., joining a shared tree) in response to receiving the source-message (e.g., the source announcement message). Notably, the path can is created from node 200f to the source node ($S_1$) according to a shortest path tree. In some embodiments, the path can be created according to a minimum hop count.

Figure 3F:
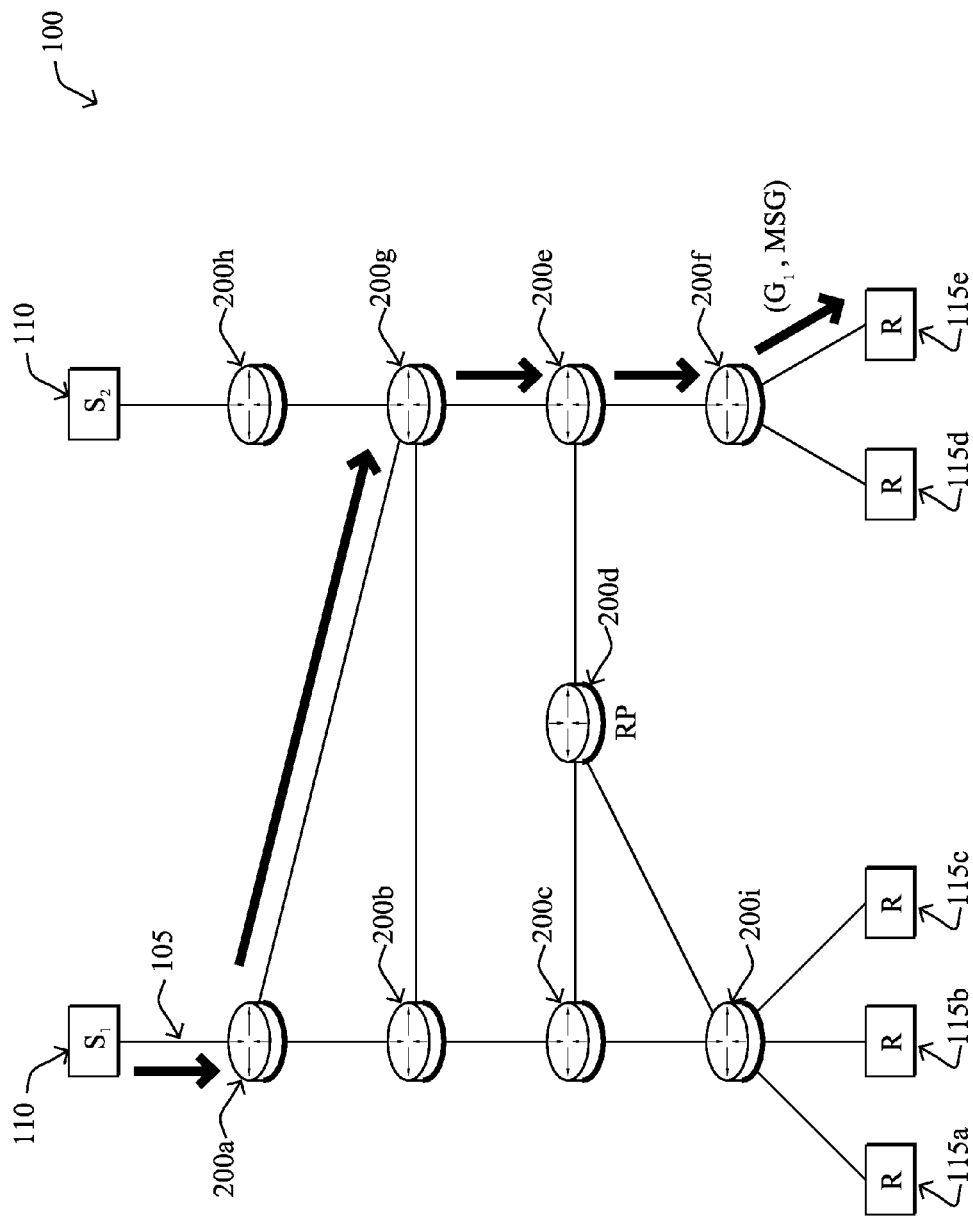

FIG. 3F shows node 200f receiving messages for the particular group $G_1$ according to the path. Notably, these messages are data plane messages.

As discussed above, FIGS. 3A-3F are arranged merely for illustration and certain other steps may be included or excluded as desired. While the discussion stepped through FIGS. 3A-3F in order, this order is merely illustrative, and any suitable arrangement of steps may be used without departing from the scope of the embodiments herein. In sum, FIGS. 3A-3F illustrate a RP (e.g., RP node 200e) in a communication network receiving an announcement message indicating one or more source-nodes (e.g., $S_1$) and associated groups (e.g., $G_1$). RP 200e further receives a request (e.g., (*,G) JOIN) from a node (e.g., node 200f) for messages of a particular group. RP 200e determines a corresponding source-node of the particular group and transmits, in response to the request, a source-message such as a BSR announcement indicating the corresponding source-node for the particular group. In turn, this causes node 200e to create a path from itself to the source-node $S_1$ to receive messages of the group $G_1$ according to the created path.

Figure 4:
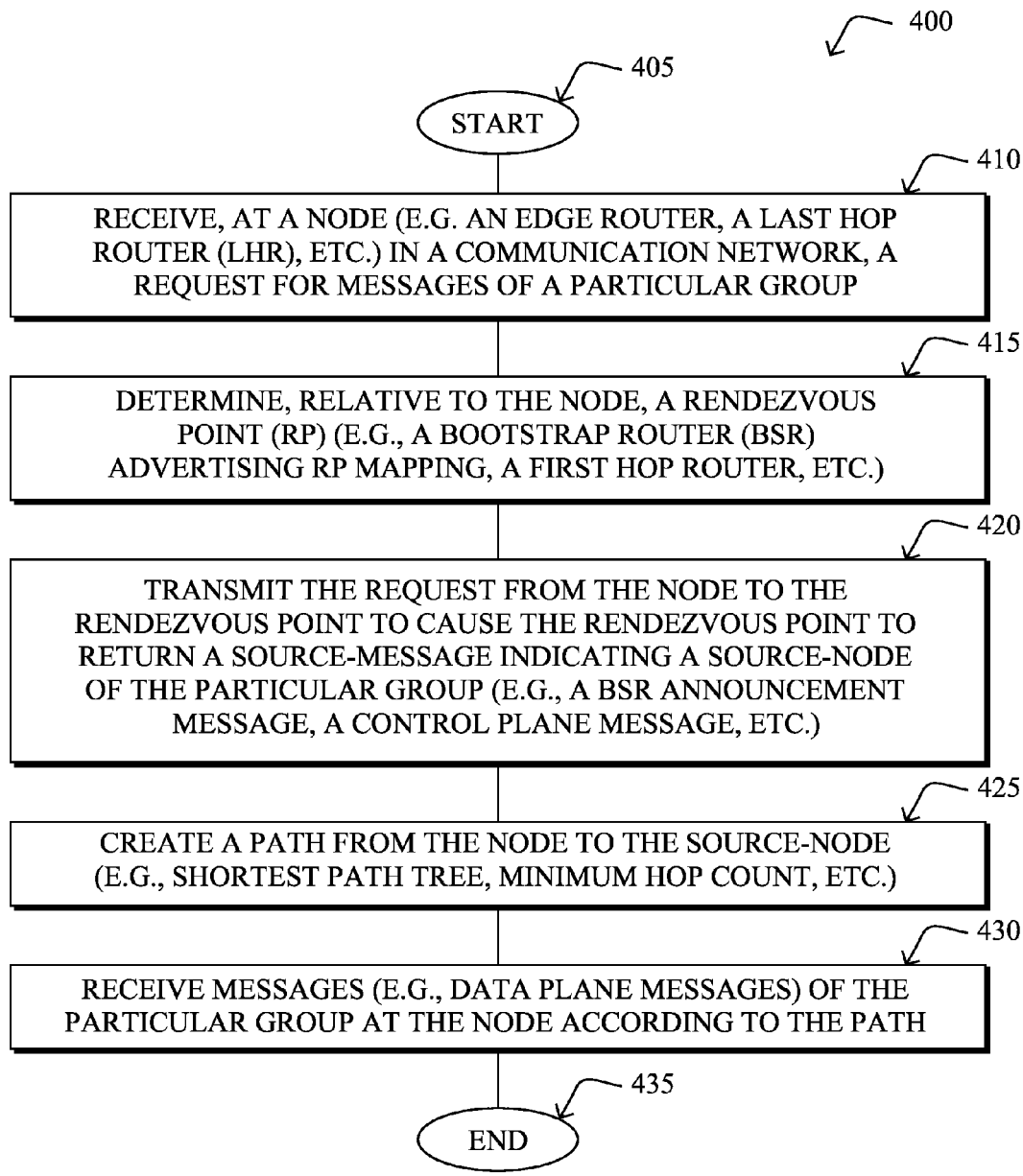
FIG. 4 illustrates an example procedure for on-demand routing, particularly from the perspective of a node.

Referring now to FIG. 4, an example simplified procedure for on-demand routing in a communication network is provided, particularly from the perspective of a node. The procedure 400 may start at step 405, and continues to step 410, where, as described in greater detail above, a node (e.g., an edge router, a Last Hop Router (LHR) can receive a request for messages for a particular group. Once received, the node can determine, in step 415, a Rendezvous Point (RP) (e.g., a Boot Strap Router (BSR) advertising mapping, a First Hop Router connected directly to a source, etc.). Next, in step 420, the node can transmit the request to the RP to cause the RP to return a source message indicating a source-node of the particular group (e.g., a BSR announcement message, a control plane message, etc.). Subsequently, the node, in step 425 can create a path to the source-node (e.g., a shortest tree path, a minimum hop count path, etc.). Once the path is created, the node can receive messages (e.g., data plane messages) of the particular group according to the path. The procedure 400 may subsequently end in step 435, or, may restart at step 405 to receive further requests.

Figure 5:
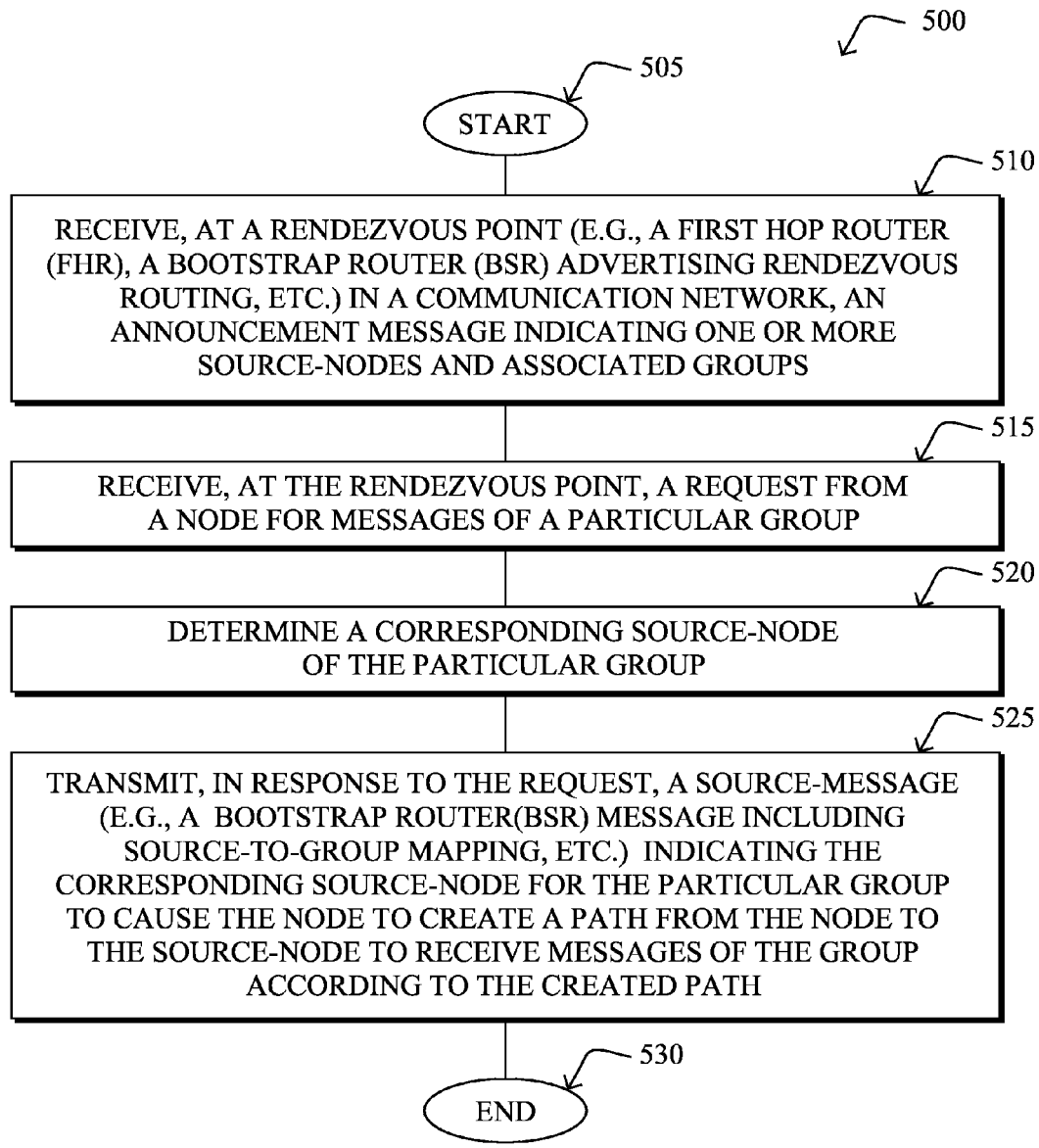
FIG. 5 illustrates an example procedure for on-demand routing, particularly from the perspective of a Rendezvous Point.

FIG. 5 illustrates an example simplified procedure 500 for on-demand routing in accordance with one or more embodiments described herein, particularly from the perspective of a Rendezvous Point (RP). The procedure 500 starts at step 505, and continues to step 510, where, as described in greater detail above, a RP receives an announcement message indicating one or more source-nodes and associated groups. In step 515 the RP further receives a request (e.g., a (*,G)JOIN request) from a node for messages of a particular group. In response, the RP, in step 520, determines a corresponding source-node of the particular group and in step 525, transmits a source-message indicating the corresponding source-node for the particular group (e.g., a Boot Strap Router (BSR) message including source-to-group mapping, etc.). In turn, this causes the node to create a path from itself to the source-node to receive messages of the group.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for learning sources of a particular group in a multicast network on-demand. In particular, the techniques herein obviate traditional Rendezvous Points, registers, and shared trees by distributing source information to all core nodes via announcements (e.g., BSR source announcements). These techniques further preserve bandwidth in communication networks by distributing source information via control plane messages. By using the techniques described herein edge routers do not need to store source information until needed.

While there have been shown and described illustrative embodiments that provide for learning source information on-demand in a communication network, it is to be understood that various other adaptations and modifications may be made within the spirit and scope of the embodiments herein. For example, the embodiments have been shown and described herein with relation to multicast networks using Sparse Mode protocols. However, the embodiments in their broader sense are not as limited, and may, in fact, be used with other types of multicast networks and/or protocols (e.g., Broadcast, Any Source Multicast, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a node in a communication network, a request for messages of a particular group;
   determining, relative to the node, a rendezvous point;
   transmitting the request from the node to the rendezvous point to cause the rendezvous point to return a source-message indicating a source-node of the particular group;
   creating a path from the node to the source-node; and
   receiving messages of the particular group at the node according to the path,
   wherein the source-message is a bootstrap router announcement message.

2. The method as in claim 1, wherein creating the path from the node to the source node comprises creating the path from the node to the source node according to a shortest path tree.

3. The method as in claim 1, wherein creating the path from the node to the source node comprises creating the path from the node to the source node according to a minimum hop count.

4. The method as in claim 1, wherein the rendezvous point is a bootstrap router advertising rendezvous point mapping.

5. The method as in claim 4, wherein the bootstrap router is a First Hop Router (FHR) relative to the source-node.

6. The method as in claim 1, wherein the bootstrap router message is a control plane message.

7. The method as in claim 1, wherein the request to receive messages for the group is a control plane message and messages of the group are data plane messages.

8. The method as in claim 1, wherein the node is a Last Hop Router (LHR) that receives the request for messages of the particular group from a receiver.

9. The method as in claim 8, wherein the rendezvous point is a router having information regarding all active sources.

10. A method, comprising:
receiving, at a rendezvous point in a communication network, an announcement message indicating one or more source-nodes and associated groups;
receiving, at the rendezvous point, a request from a node for messages of a particular group;
determining a corresponding source-node of the particular group;
transmitting, in response to the request, a source-message indicating the corresponding source-node for the particular group to cause the node to create a path from the node to the source-node to receive messages of the group according to the created path,
wherein the source-message is a bootstrap router announcement message.

11. The method as in claim 10, wherein the source-message is a bootstrap router message (BSR) comprising source-to-group mapping.

12. The method as in claim 10, wherein the rendezvous point is a bootstrap router advertising rendezvous point mapping.

13. The method as in claim 12, wherein the bootstrap router is a first hop router relative to the source-node.

14. The method as in claim 10, wherein the bootstrap router message is a control plane message.

15. The method as in claim 10, wherein the request to receive messages for the group is a control plane message and messages of the group are data plane messages.

16. The method as in claim 15, wherein the rendezvous point is a router having information regarding all sources.

17. The method as in claim 10, wherein the node is a last hop router that receives the request for messages of the particular group from a receiver.

18. The method as in claim 10, wherein the announcement messages are bootstrap router messages comprising source-to-group mapping.

19. A tangible, non-transitory, computer-readable media having software encoded thereon, the software when executed by a processor operable to:
receive, at a node in a communication network, a request for messages of a particular group;
determine, relative to the node, a rendezvous point;
transmit the request from the node to the rendezvous point to cause the rendezvous point to return a source-message indicating a source-node of the particular group;
create a path from the node to the source-node; and
receive messages of the particular group at the node according to the path,
wherein the source-message is a bootstrap router announcement message.

* * * * *